US012633753B2

(12) United States Patent　　　　(10) Patent No.:　US 12,633,753 B2
Orus et al.　　　　　　　　　　　　(45) Date of Patent:　May 19, 2026

(54) OPTIMIZED PROVISION AND CONSUMPTION OF ELECTRICITY BY HOUSEHOLDS TO REDUCE NON-RENEWABLE ELECTRICAL ENERGY IN ELECTRIC GRID

(71) Applicant: MULTIVERSE COMPUTING, S.L., Donostia (ES)

(72) Inventors: Roman Orus, Donostia (ES); Gianni Del Bimbo, Donostia (ES)

(73) Assignee: MULTIVERSE COMPUTING, S.L., Donostia (ES)

( * ) Notice: Subject to any disclaimer, the term of this patent is extended or adjusted under 35 U.S.C. 154(b) by 369 days.

(21) Appl. No.: 18/398,862

(22) Filed: Dec. 28, 2023

(65) Prior Publication Data

US 2025/0202239 A1　　Jun. 19, 2025

(30) Foreign Application Priority Data

Dec. 19, 2023　(EP) ..................................... 23383318

(51) Int. Cl.
*H02J 3/00*　　　(2026.01)
*H02J 3/38*　　　(2006.01)
*H02J 3/466*　　(2026.01)
*H02J 101/20*　　(2026.01)
*H02J 103/35*　　(2026.01)

(52) U.S. Cl.
CPC .............. *H02J 3/381* (2013.01); *H02J 3/003* (2020.01); *H02J 3/004* (2020.01); *H02J 3/466* (2020.01); *H02J 2101/20* (2026.01); *H02J 2103/35* (2026.01)

(58) Field of Classification Search
CPC .. H02J 3/381; H02J 3/003; H02J 3/004; H02J 3/466; H02J 2101/20; H02J 2103/35
See application file for complete search history.

(56) References Cited

U.S. PATENT DOCUMENTS 10,334,664 B2　6/2019　Wiszniewski et al.
2011/0172837 A1　7/2011　Forbes, Jr.
(Continued)

OTHER PUBLICATIONS

European Search Report for Application No. 23383318.5, dated Jun. 26, 2024, 5 pages.

*Primary Examiner* — Michael W Choi
(74) *Attorney, Agent, or Firm* — CANTOR COLBURN LLP

(57)　　　ABSTRACT

A method includes: receiving, by an apparatus or system, a first set of values for an electric grid, a second set for a first electricity supply, and a third set for a second electricity supply; receiving data from electricity controllers, wherein all the received data form a fourth set of values, wherein each electricity controller of the controllers is associated with a household of multiple households and controls electricity supplied to the electric grid, stored and requested from the electric grid at the different time periods within the PT, wherein each household includes at least one renewable electrical energy production device and the fourth set of values is indicative of electrical energy producible by each device of the at least one renewable energy production device at the different time periods within the PT; solving, by the apparatus or system based on the four sets of values, an optimization problem.

16 Claims, 2 Drawing Sheets

(56)                    References Cited

U.S. PATENT DOCUMENTS

2014/0163756 A1*   6/2014   Idrees ................... G06Q 50/06
                                                                     700/291
2014/0200723 A1    7/2014   Roy et al.
2017/0005515 A1*   1/2017   Sanders ................... H02J 3/14
2020/0039377 A1*   2/2020   Pettersson ............. G06Q 10/00
2020/0082289 A1    3/2020   Swierc et al.
2023/0052726 A1*   2/2023   Wei ....................... F03D 7/0284
2023/0187933 A1*   6/2023   Buttgenbach .......... H02J 3/003
                                                                     307/38
2025/0038530 A1*   1/2025   Swenson ................ H02J 3/007

* cited by examiner

OPTIMIZED PROVISION AND CONSUMPTION OF ELECTRICITY BY HOUSEHOLDS TO REDUCE NON-RENEWABLE ELECTRICAL ENERGY IN ELECTRIC GRID

CROSS-REFERENCE TO RELATED APPLICATIONS

This application claims the benefit of European patent application 23383318.5, filed on Dec. 19, 2023, the disclosure of which is incorporated herein by reference in its entirety.

TECHNICAL FIELD

The present disclosure relates to the field of electricity. More specifically, it relates to controlling the provision of renewable electrical energy produced at households to an electric grid to lower the electric grid's dependence on non-renewable electrical energy, and possible consumption of electrical energy of the electric grid whenever necessary to reduce excess available electrical energy.

BACKGROUND

The advances in electricity production and electricity storage have caused a cost reduction of renewable electrical energy production devices and batteries, thereby making them more affordable to end consumers in their households. Along with this situation, some countries force the installation of such devices in new households and buildings whenever they are built or old ones are restored, hence there has been a growth in the ubiquity of these devices. Further, the progressive adoption of electrical vehicles such as cars and motorbikes has, on the one hand, increased the electricity demand of consumers and, on the other hand, made available to the consumers storage (or additional storage) of electricity.

All this has modified the way in which electricity must be produced and stored by the electric grid to serve all the end consumers in an efficient manner. The electric grid provides electricity to the different households whenever they demand electricity and the renewable electrical energy they produce is insufficient or is not used and kept stored. The renewable electrical energy produced at the households may likewise be provided to the electric grid so that other end consumers can use it if necessary.

The global trend is to reduce the number of non-renewable electrical energy sources, such as fossil fuels, that are needed for electrically powering all households, buildings, factories, and means of transportation. A small contribution towards this goal is, for example, to use appliances whenever there are no significant electricity demands in the grid so that most, if not all, electricity delivered to the household for powering of the appliances comes from a renewable electrical energy source.

The electric grids are configured in such a way that they get electrical energy at different amounts for each e.g. hour of the day, and that electrical energy is available for serving the demands of electricity consumers like households. The electrical energy the electric grid gets comes from a number of different sources of electrical energy. Even if the amount of electrical energy in the electric grid depends on the time of the day to adapt to the typical electricity demand through-out the day, electric power consumption is variable. Hence, at times there is a shortage of electrical energy in the electric grid for serving the customers, namely the demand exceeds the availability, and at some other times there is excess of electrical energy in the electric grid, namely the availability exceeds the demand. To avoid leaving consumers not served or not completely served, and also to avoid leaving excess electricity in the electric grid, the electric grid is or may be electrically connected with predetermined additional electrical energy reserves, predetermined additional electrical energy generators, and predetermined additional electrical energy consumers that may assist in balancing the electric grid.

Ideally, none of these additional resources would have to be used if the electric grid were balanced, but since they are necessary and households can also take part of these additional resources, there is an interest in conducting aggregation of households to jointly participate in the electrical energy market to balance the electric grid. Many households produce renewable electrical energy; therefore, households can achieve more sustainable energy environments by cooperating in the provision and consumption of electrical energy such that they prevent non-renewable electrical energy from entering into the electrical grid.

SUMMARY

A first aspect of the disclosure relates to a method that comprises:

receiving a first set of values for an electric grid, a second set of values for a first electricity supply, and a third set of values for a second electricity supply, where:

the first set of values is indicative of electric power availability in the electric grid at different time periods within a predetermined period of time, PT, the first set of values being also indicative of an amount or ratio of the available electric power being from renewable electrical energy;

the first electricity supply comprises electric power reserves of one or more electrical energy supplying systems associated with the electric grid and possible electric power consumption by first potential consumers associated with the electric grid, and the second set of values being indicative of both the electric power reserves available and the possible electric power consumption of the first potential consumers at the different time periods within the predetermined period of time, i.e. the PT; and the second electricity supply comprises possible electric power generation by one or more electrical energy generators associated with the electric grid and possible electric power consumption by second potential consumers associated with the electric grid, and the third set of values being indicative of both the possible electric power generation and the possible electric power consumption of the second potential consumers at the different time periods within the PT, where the one or more electrical energy generators are capable of starting electric power generation with a predetermined time delay and are capable of maintaining the electric power production for at least a predetermined time duration;

receiving data from a plurality of electricity controllers, where all the received data form a fourth set of values, where each electricity controller of the plurality of controllers is associated with a household of a plurality of households and controls electricity supplied to the electric grid, stored and requested from the electric grid at the different time periods within the PT, where each household of the plurality of households comprises at least one renewable electrical energy production device, and the fourth set of values is indicative of electrical energy producible by each device of the at least one renewable energy production device at the different time periods within the PT;

solving, based on the first, second, third and fourth sets of values, an optimization problem in which:

each electricity controller of the plurality of electricity controllers has each renewable electrical energy production device it controls assigned to one of the first electricity supply to be available as an electric power reserve, the second electricity supply to be available as an electrical generator, or neither electricity supply at each time period within the PT; and each electricity controller of the plurality of electricity controllers has each household it controls assigned to one of the first electricity supply to demand electric power, the second electricity supply to demand electric power, or neither electricity supply at each time period within the PT;

where the optimization problem increases both:

availability of renewable electrical energy deliverable by the electric grid, at each time period within the PT, whenever the first electricity supply and/or the second electricity supply provide electric power to the electric grid when the electricity demand exceeds the available electric power in the electric grid; and consumption of electrical energy deliverable by the electric grid, at each time period within the PT, when the available electric power in the electric grid exceeds the electricity demand;

where a result of the optimization problem comprises:

an allocation, by each electricity controller, of one, some or all respective devices of the plurality of renewable electrical energy production devices to one of the first and second supplies at one, some or all the different time periods within the PT; and a request, by each electricity controller, of electric power from the electric grid for supply to the respective household at one, some or all the different time periods within the PT.

An apparatus or system conducts the aforesaid reception and solving steps. The apparatus or system includes one of: a computing apparatus, a computing system, a quantum apparatus, a quantum system, or a combination thereof.

The apparatus or system, which may be a virtual power plant (VPP), optimizes when one or more renewable electrical energy production devices are capable of providing electricity to the electric grid and to what degree (e.g. for how long and/or how much electricity) that, aside from the availability of renewable electrical energy to be produced by said production devices, it may also be dependent on the expected electric power consumption by the household that the one or more devices are associated with. To this end, the apparatus or system may receive from electricity controllers a predetermined electricity consumption plan that is an estimation of the electricity consumption by a given household. And by processing the data about the predetermined electricity consumption plan, it may be determined in the optimization that renewable electrical energy that a production device of a household will have available makes a greater contribution to the reduction of the overall non-renewable electrical energy in the electric grid by keeping it for consumption by the household than providing it to the electric grid. That is to say, it may occur that the apparatus or system determines that no renewable electrical energy shall be provided to the electric grid as it may be more convenient that the household uses its own produced renewable electrical energy rather than having to demand electricity (or having to demand much more electricity whenever the produced electricity is not enough) from the electric grid because that ultimately will cause that less electrical energy must be sought by the grid and possibly being non-renewable.

And the apparatus or system also optimizes when one or more households are to demand electricity from the electric grid aside from those moments when appliances within the households or people therein require electric power, and how much electricity the households demand from the electric grid to reduce the excess available electric power in the grid. The demanded electricity can be used for powering e.g. appliances, vehicles, etc. right away, or be stored in one or more batteries associated with the household for use at a later time when requested by the appliances or the people in the household.

For the optimization, the apparatus or system processes each of the first, second, and third sets of values to establish, for each time period, how much electric power is available in the electric grid and how much thereof is from renewal electrical energy, and how many electric power reserves, electric power generation and possible electric power consumption is available for use by the electric grid. The apparatus or system likewise processes the fourth set of values to establish, for each time period, how much renewable electrical energy is available at each household due to the production devices thereof and, optionally, how much electric power the household typically consumes. Based on the processed data, the apparatus or system optimizes one or more cost functions defined for the optimization problem.

The optimization is intended to find available renewable electrical energy within the households and make it available to the electric grid through the respective electricity controller whenever there is a shortage in the supply it has, particularly in the first and second electricity supplies; and it is also intended to find available households for electrical consumption and make the households available to the electric grid for electricity consumption through the respective electricity controller whenever there is an excess in the supply the electric grid has, at least in the first and second electricity supplies but preferably also in the electric grid itself.

The optimization is conducted for the entirety of the PT (e.g. 12 hours, 24 hours, 36 hours, etc.), which is subdivided into a plurality of time periods of same duration (e.g. 30 minutes, 1 hour, 2 hours, etc.) that the electric grid uses for organizing all the resources it has or that it has access to.

As a result of the optimization, a list of possible windows may be provided in the form of time periods when each particular renewable electrical energy production device may have to provide electricity to the electric grid, and a list of possible windows may be provided in the form of time periods when each particular household may have to request electricity from the electric grid. In the windows related to the provision of electricity to the electric grid, the optimization also determines in which of the first and second electricity supplies the production device may have to provide electricity.

When there is shortage of electricity in the electric grid, the electric grid usually first demands electricity from the first electricity supply, and then from the second electricity supply when it requires even more electricity, or at least demands more electricity from the first electricity supply than from the second electricity supply due to the more instantaneous availability of the demanded electricity. The electric grid usually follows the same hierarchy when there is excess electricity in the electric grid and the electric grid seeks additional electricity consumption.

Even if the first electricity supply is more demanded than the second electricity supply, the mere availability of electric power reserves and possible electric power generation is necessary for the correct operation of the electric grid, and the resources associated therewith get blocked from other uses, thereby resulting in a loss of overall efficiency. But in any case, having renewable electrical energy available in these supplies reduces non-renewable electrical energy available in these supplies, thereby increasing the sustainability of the electric grid system.

The electrical energy that the renewable electrical energy production devices will provide might be established by way of e.g. historical data, probability distribution, mathematical models and artificial intelligence algorithms that combine any of these data with e.g. weather data, etc.; there are a number of calculation techniques for providing the availability, which are not described in the present disclosure in order not to obscure the present teachings, but all said calculation techniques are possible within the scope of the present disclosure. Likewise, when consumption plans of the households are considered, they may be established by way of e.g. historical data, probability distributions, consumer profiling, etc.; there are a number of calculation techniques for providing an electricity consumption plan, which are not described in the present disclosure in order not to obscure the present teachings, but all said calculation techniques are possible within the scope of the present disclosure.

In some embodiments, the method further comprises commanding, by the apparatus or system, to each electricity controller to deliver electric power from the respective plurality of renewable electrical energy production devices to the electric grid according to the optimized allocation.

In some embodiments, the method further comprises commanding, by the apparatus or system, to each electricity controller to request electric power from the electric grid to provide to the respective household according to the optimized request.

After conducting the optimization, the apparatus or system manages the delivery of electrical energy to the electric grid according to the allocation and/or manages the demand of electrical energy from the households according to the request.

This means that electricity is provided to the electric grid at the time periods that the apparatus or system has determined to be the most convenient ones for reducing the number of non-renewable electrical energy in the first and/or second electricity supplies. And that electricity is provided from the electric grid to the households at the time periods that the apparatus or system has determined to be the most convenient ones for reducing the excess electricity in the grid in such a way that it reduces the number of non-renewable electrical energy in the first and/or second electricity supplies that will have to be required at a later time due to e.g. the electric power required by the households at a later time if they do not demand electric power now when there is excess.

In some embodiments, the first set of values is also indicative of an amount or ratio of the electric power reserves being from renewable electrical energy.

In some embodiments, the second set of values is also indicative of an amount or ratio of the possible electric power generation being electric power from renewable electrical energy.

As part of the optimization, the apparatus or system may also consider the type of electric power reserves and/or possible electric power generation when such data is provided to it. The apparatus or system processes the amount/ratio data and includes it into the optimization problem.

In some embodiments, in the result of the optimization the plurality of renewable electrical energy production devices is not allocated to one of the first and second supplies at time periods when:

the amount or ratio of the available electric power being from renewable electrical energy exceeds a first predetermined threshold; or an amount or ratio of the available electric reserves being from renewable electrical energy exceeds a second predetermined threshold; or an amount or ratio of the possible electric power generation being electric power from renewable electrical energy exceeds a third predetermined threshold.

A restriction may be established whereby renewable electrical energy production devices are not allocated to provide electrical energy to the electric grid when the amount of electricity in the electric grid, the electric power reserves and/or the possible electric power generation includes a sufficient amount, according to a respective threshold, of renewable electrical energy. As the first and second electricity supplies block the availability of the concerned resources, oftentimes the no demand (or lower demand) of electricity from the electric grid by the household owing to the renewable electrical energy it produced is more convenient for reducing the number of non-renewable electrical energy sources in the electric grid system.

In these cases, since the amount of renewable electrical energy is sufficient according to the threshold, the electricity that households produce via their respective production devices is kept within the household for storage or consumption by the apparatuses, appliances and/or transportation means that are to be electrically powered.

In some embodiments, solving the optimization problem comprises constructing first and second flexibility vectors per electricity controller, or receiving the first and second flexibility vectors from each electricity controller. The first flexibility vector is indicative of: availability of the respective plurality of renewable electrical energy production devices for delivery of electric power to the electric grid in the first electricity supply at the different time periods within the PT, and availability of the respective household for demanding electric power from the electric grid in the first electricity supply at the different time periods within the PT. And the second flexibility vector is indicative of: availability of the respective plurality of renewable electrical energy production devices for delivery of electric power to the electric grid in the second electricity supply at the different time periods within the PT, and availability of the respective household for demanding electric power from the electric grid in the second electricity supply at the different time periods within the PT.

The flexibility vectors may have at least two distinct variables defining the flexibility of the household to participate in the provision of electricity to (particularly, of one, some or all renewable electrical energy production devices associated therewith) or consumption of electricity from the electric grid. Particularly, the first and second flexibility vectors may respectively take the following form:

$$F_1^{i,\sigma} = \left\{\left(W_{i,t,\tau}^{\sigma}, \mu_{i,t,\tau}^{\sigma}\right)\right\}, \quad t = \{0, 1, \ldots, D-1\}, \tau = \{0, 1, \ldots, N-1\}$$

$$F_2^{i,\sigma} = \left\{\left(E_{i,t}^{\sigma}, \lambda_{i,t}^{\sigma}\right)\right\}, \quad t = \{0, 1, \ldots, D-1\}$$

where: t is the particular time period extending the predetermined period of time D; $\tau$ is a particular subinterval of any given particular time period t among N different subintervals of t;

$$W_{i,t,\tau}^{\sigma}$$

is the power band of electric power be provided to or consumed from the electric grid in the first electricity supply, by the household and production devices thereof of the i-th electricity controller, at time period t and subinterval $\tau$;

$$E_{i,t}^{\sigma}$$

is the electrical energy to be provided to or consumed from the electric grid in the second electricity supply, by the household and production devices thereof of the i-th electricity controller, at time period t;

$$\lambda_{i,t}^{\sigma}$$

is a parameter or set of parameters defining, for the i-th electricity controller at time period t, an objective to be met for electrical energy to be provided to the electric grid or consumed from the electric grid in the second electricity supply, by the household and production devices thereof of the i-th electricity controller, at time period t;

$$\mu_{i,t,\tau}^{\sigma}$$

is a parameter or set of parameters defining, for the i-th electricity controller at time period t and subinterval $\tau$, an objective to be met for electric power to be provided to the electric grid or consumed from the electric grid in the first supply, by the household and production devices thereof of the i-th electricity controller, at time period t and subinterval $\tau$.

Provision of electric power and electrical energy to the electric grid is considered for $\sigma=+$ and consumption therefrom is considered for $\sigma=-$.

The parameters or sets of parameters $\lambda$ and $\mu$ might be distinct for each electricity controller and, thus, for each household especially when the regular consumption of the household is considered prior to requesting electricity from the electric grid when there is excess electricity. The expected consumption of electric power by the household influences the optimization because a household may be allocated for delivery of electricity by one or more of its production devices depending on whether it will require electric power later on and it is not foreseen that there will be excess electric power in the electric grid at those times.

The provision of the flexibility vectors simplifies the eventual objective function to be optimized by the apparatus or system since each flexibility vector relates to one household, and the objective function relates to all households, thereby conducting the optimization over all households for a global solution.

In some embodiments, each first flexibility vector includes at least one binary variable per renewable electrical energy production device and per different time period within the PT, the first flexibility vector being indicative of the participation of each renewable electrical energy production device in the respective electrical energy supply at the respective time period, wherein the at least one binary variable for each device in the flexibility vector for the second supply includes two binary variables each indicative of the participation of the respective renewable electrical energy production device as a starting participant or a backup participant, and wherein each renewable electrical energy production can participate only once within the PT, either in the first or the second supplies.

Electric grids are generally configured such that possible electric power generation requires starting and backup participants; the same also occurs with regards possible electric power consumption when there is excess electricity available in the electric grid for consumption, electricity consumers as starting and backup participants are provided.

Starting participants are the generators (or consumers when excess electric power must be consumed) that will initially attempt to provide the necessary electricity to the electric grid. Backup participants are the generators (or consumers when excess electric power must be consumed) that take the place of starting participants that are not capable of providing the necessary electricity for whatever reason (e.g. generator malfunction, problem in the transport network, etc.). There has to be a pool of starting participants and a pool of backup participants that the electric grid may choose from. The optimization conducted by the apparatus or system likewise determines whether renewable electrical energy production devices are to deliver electricity to the electric grid, and whether each one has to do so as starting participant or backup participant; and alike determination is made with respect to households when excess electricity may have to be consumed by them.

In some embodiments, for participation of the renewable electrical energy production devices in the second supply at each time period in the optimization problem, combined electric power or electrical energy of the devices participating as starting participants is equal to or smaller than combined electric power or electrical energy of the devices participating as backup participants at the respective time period.

The same amount of electricity or more electricity must be available for delivery to the electric grid by the backup participants than by the starting participants so as to be able to cope with problems that may arise in the electricity production of the starting participants.

In some embodiments, a sum of the combined electric power or electrical energy of both the renewable electrical energy production devices participating as starting participants and the renewable electrical energy production devices participating as backup participants in the optimization problem must be sufficient to maintain electric power production for at least the predetermined time duration.

The requirement that is imposed in the second electricity supply most of the times regarding the capability of maintaining the production of electric power during the predetermined time duration shall be met by both the starting participants and the backup participants. That way, if there are problems within the starting participants, the backup participants may provide the electric power for the entire time duration.

In some embodiments, for participation of the renewable electrical energy production devices in the first electricity supply in the optimization problem, a sum of combined electric power of the participating devices at time t when the electric power availability is less than the electric power demand, and combined electric power of the participating devices at time t when the electric power availability is less than the electric power demand, must be greater than or equal to a minimum power band size and lower than or equal to a maximum power band size, respectively.

The power band that an electricity controller can allocate for delivery of electric power to the electric grid, $\widehat{WO}_t^{+}$, and/or that it can allocate for request of electric power from the electric grid, $\widehat{WO}_t^{-}$, is related to minimum and maximum power band sizes, $$B_t^+ \text{ and } B_t^-,$$

as follows:

$$\widehat{WO}_t^{-} \leq B_t^-$$

$$\widehat{WO}_t^{+} \geq B_t^+$$

Such limitation may be imposed by the electric grid to avoid very reduced or very high contributions of households for safety reasons, or be imposed by the apparatus or system to avoid too low contributions whereby losses in the transportation of the electrical energy might reduce the impact of using the households for sustainability of the electric grid system.

In some embodiments, for participation of the renewable electrical energy production devices associated in the first electricity supply in the optimization problem, each time period t is divided into a plurality of subintervals τ, and the renewable electrical energy production devices to participate at the respective time period t is divided into the respective plurality of subintervals τ such that combined electric power of the participating devices in each subinterval t is similar (e.g. between 0.85 times and 1.15 times, more preferably between 0.90 times and 1.10 times, and more preferably between 0.95 times and 1.05 times) to the combined electric power of the participating devices in the other subintervals τ of the plurality of subintervals τ for the same time t.

The electric power provided to the electric grid by the renewable electrical energy production devices by all electricity controllers should be similar throughout the entire time period t so that in no subinterval thereof significantly more electric power is provided than in other subinterval τ. Otherwise, there is the risk that there will be a shortage of electric power during some subinterval τ due to the lower electric power provided. Namely:

$$\sum_i y_{i,t,0}^{\sigma} W_{i,t,0}^{\sigma} \approx \sum_i y_{i,t,1}^{\sigma} W_{i,t,1}^{\sigma} \approx \ldots \approx \sum_i y_{i,t,N-1}^{\sigma} W_{i,t,N-1}^{\sigma}$$

where: i denotes each particular electricity controller of the plurality of electricity controllers;

$$y_{i,t,\tau}^{\sigma} = \{0, 1\}$$

is a binary variable that specifies whether the production devices associated with the i-th electricity controller participate in the first electricity supply at subinterval τ of time period t, depending on the sign of σ; and $$W_{i,t,\tau}^{\sigma}$$

is a power band allocated for provision by the production devices associated with the i-th electricity controller in the first electricity supply at subinterval τ of time period t, depending on the sign of σ.

In some embodiments, the optimization problem is defined by the following function:

$$C_0 = -\sum_{\sigma=\pm} \sum_{t=0}^{D-1} \left[ \sigma \left( \Gamma_t^{\sigma} - \hat{\lambda}_t^{\sigma} \right) \hat{E}_t^{\sigma} \eta_t^{(2)\sigma} + (M_t^{\sigma} - \hat{\mu}_t^{\sigma}) \hat{W}_t^{\sigma} + \eta_t^{(1)\sigma} \hat{W}_t^{\sigma} \Gamma_t^{\sigma} \right]$$

where:
σ is either the electric power availability is less than the electric power demand when positive, or the electric power availability is more than the electric power demand when negative, and superscript σ refers to the concerned parameter in the direction of σ;
D is the predetermined period of time;
t is one subinterval of a plurality of subintervals of the PT;

$$\hat{E}_t^{\sigma}$$

is an aggregated electrical energy in the second electricity supply at time t;

$$\hat{\lambda}_t^{\sigma}$$

is a parameter related to an amount of renewable electrical energy in the second electricity supply at time t;

$$\hat{W}_t^{\sigma}$$

is an aggregated power band in the first electricity supply at time t;

$$\hat{\mu}_t^{\sigma}$$

is a parameter related to an amount of renewable electrical energy in the first electricity supply at time t;

$$M_t^{\sigma} \text{ and } \Gamma_t^{\sigma}$$

are cost of electrical energy of the first electricity supply and the second electricity supply, respectively, at time t; and $$\eta_t^{(1)\sigma} \text{ and } \eta_t^{(2)\sigma}$$

are parameters corresponding to either allocated electrical energy fractions for the first electricity supply and the second electricity supply, respectively, at time t, or definitions of a level of stochasticity of or level of confidence in carrying out the provision and consumption (depending on the sign of $\sigma$) of electricity to/from the electric grid.

The term $$\hat{W}_t^{\sigma}$$

may take different forms, an exemplary one being as follows:

$$\hat{W}_t^{\sigma} = \sum_i \sum_{\tau=0}^{N-1} y_{i,t,\tau}^{\sigma} W_{i,t,\tau}^{\sigma}$$

where: i denotes each particular electricity controller of the plurality of electricity controllers;

$$y_{i,t,\tau}^{\sigma} = \{0, 1\}$$

is a binary variable that specifies whether the production devices or household associated with the i-th electricity controller participate in the first electricity supply at subinterval $\tau$ of time period t, depending on the sign of $\sigma$; and $$W_{i,t,\tau}^{\sigma}$$

is a power band allocated for provision by the production devices or consumption by the household associated with the i-th electricity controller in the first electricity supply at subinterval $\tau$ of time period t, depending on the sign of $\sigma$.

The term $$\hat{E}_t^{\sigma}$$

may take different forms, an exemplary one (in which the allocation of the household or the production devices of the households is additionally, but not necessarily, distributed into starting participants and backup participants) being as follows:

$$\hat{E}_t^{\sigma} = \sum_i \left( x_{i,t,SP}^{\sigma} E_{i,\tau,SP}^{\sigma} + x_{i,t,BP}^{\sigma} E_{i,t,BP}^{\sigma} \right)$$

where: subscript SP denotes starting participant, and subscript BP denotes backup participants;

$$x_{i,t,SP}^{\sigma} = \{0, 1\} \text{ and } x_{i,t,BP}^{\sigma} = \{0, 1\}$$

are binary variables defining whether the i-th electricity controller sets the household or respective production devices for participation as starting participant $$\left( x_{i,t,SP}^{\sigma} = 1 \right)$$

or as a backup participant $$\left( x_{i,t,BP}^{\sigma} = 1 \right),$$

respectively, in the second electricity supply at time t depending on the sign of U.

Another exemplary form for said term in which no distribution into starting participants and backup participants is made is as follows:

$$\hat{E}_t^{\sigma} = \sum_i \left( x_{i,t}^{\sigma} E_{i,\tau}^{\sigma} \right)$$

In some embodiments, the first and second sets of values comprise a cost of the electric power reserves and a cost of the possible electric power generation, respectively, that are indicative of the amount or ratio of the electric power reserves being from renewable electrical energy, and of the amount or ratio of the possible electric power generation being electric power from renewable electrical energy.

The cost that any agent associated with the electric grid must pay for the electric power reserves and/or the possible electric power generation depends on the amount or ratio of the electric power thereof being renewable electrical energy. This means that cost may be a parameter for assessing how much electrical energy is renewable.

In some embodiments, the first electricity supply is a second electrical energy market, and the second electricity supply is a tertiary electrical energy market.

Some electric grids have access to the first electricity supply by means of the second electrical energy market, and to the second electricity supply by means of the tertiary electrical energy market.

In some embodiments, the first set of values comprises a cost of the electricity that is indicative of the amount or ratio of the available electric power being from renewable electrical energy.

In some embodiments, the optimization problem is solved with one of the following techniques:

quantum annealing whereby a lowest-energy configuration is found in an energy function (such as a physical Hamiltonian) that a cost function of the optimization problem is first converted into; or quantum computing based on individual atomic ions in a quantum apparatus or system with radiofrequency traps for trapping the ions and with a laser-based quantum circuit; or quantum classifying based on neutral atoms that function as quantum bits in a quantum apparatus or system with a laser-based quantum circuit.

The use of quantum techniques for conducting the optimization generally reduces the time it takes to conduct the optimization in comparison with classical processors. This even more so as the number of electricity controllers becomes larger, more time periods and/or subintervals are considered due to the way the electric grid organizes resources thereof, and/or the predetermined period of time, i.e. PT, becomes longer.

It is also noted that the optimization is run for all the electricity controllers that are to contribute in making the electric grid more sustainable, which makes the optimization more complex. That is to say, the optimization does not involve optimizing the resources of each particular electricity controller independently from the rest, but rather in a combined or global manner whereby all electricity controllers cooperate to reduce electricity from non-renewable sources in the electric grid. Such type of optimization might not be conducted by classical processors in time for effecting the resulting allocation and requests.

A second aspect of the disclosure relates to a data and/or quantum processing device or system including means for carrying out the steps of a method according to the first aspect.

A third aspect of the disclosure relates to a device or system including: at least one processor, and at least one memory including computer program code for one or more programs; the at least one processor, the at least one memory, and the computer program code configured to cause the device or system to at least carry out the steps of a method according to the first aspect.

A fourth aspect of the disclosure relates to a computing and/or quantum apparatus or system including means for carrying out the steps of a method according to the first aspect.

A fifth aspect of the disclosure relates to a computer program product including instructions which, when the program is executed by a computer, cause the computer to carry out the steps of a method according to the first aspect.

A sixth aspect of the disclosure relates to a non-transitory computer-readable medium encoded with instructions that, when executed by at least one processor or hardware, perform or make a device to perform the steps of a method according to the first aspect.

A seventh aspect of the disclosure relates to a computer-readable data carrier having stored thereon a computer program product according to the sixth aspect.

BRIEF DESCRIPTION OF THE DRAWINGS

To complete the description and in order to provide for a better understanding of the disclosure, a set of drawings is provided. Said drawings form an integral part of the description and illustrate embodiments, which should not be interpreted as restricting the scope of the disclosure, but just as examples of how the disclosed methods or entities can be carried out. The drawings comprise the following figures.

DETAILED DESCRIPTION OF THE DRAWINGS

Figure 1:
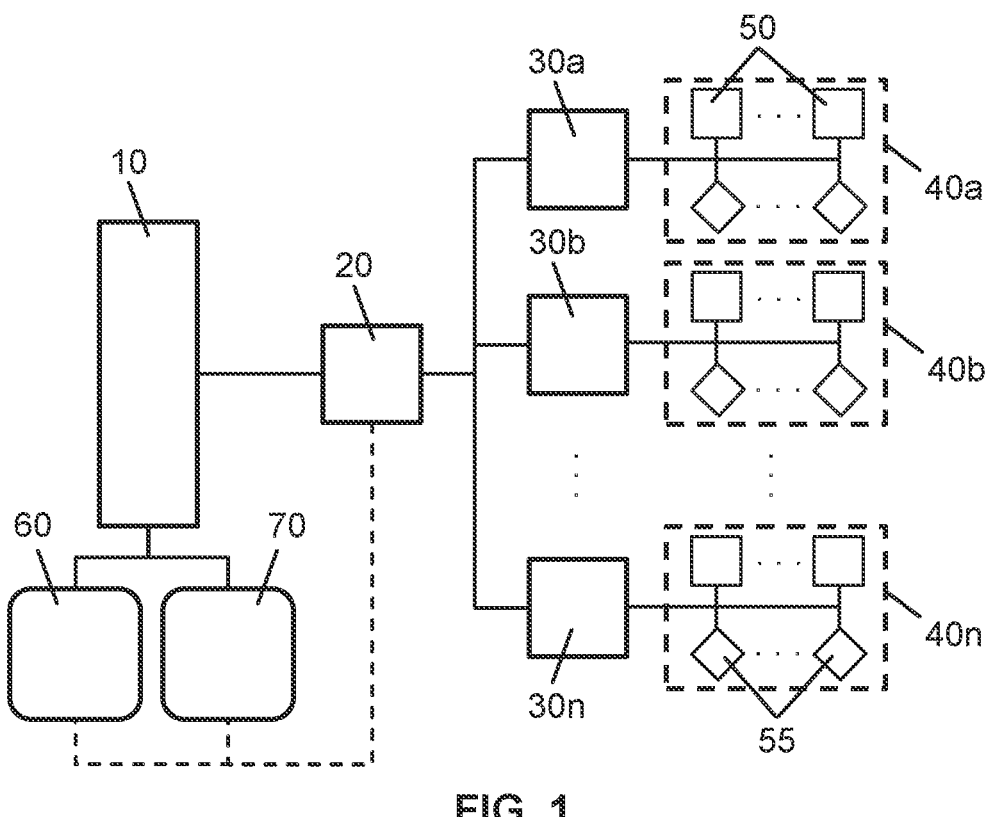
FIG. 1 shows an electrical network from electric grid to households, i.e. an electric grid system.

FIG. 1 shows an electrical network.

The electrical network has an electric grid 10 that provides electricity to end consumers such as households 40a-40n. The electric grid 10 both delivers electricity to the end consumers for electrically powering devices, appliances and/or vehicles 50 that are associated with the households 40a-40n, and might receive electricity produced by renewable electrical energy production devices 55 that are associated with the households 40a-40n. Although not illustrated, it is apparent that not all households 40a-40n have renewable electrical energy production devices 55 that can provide electricity to the electric grid 10.

Each household 40a-40n has an electricity controller 30a-30n associated therewith that manages both the ingress of electricity towards the household 40a-40n, namely the electricity supplied by the electric grid 10 is delivered to the household 40a-40n for powering of the devices, appliances and/or vehicles 50, and the egress of electricity towards the electric grid 10, namely the electricity provided by the renewable electrical energy production devices 55 is delivered to the electric grid 10. The egress of electricity can also be via a first electricity supply 60 and/or a second electricity supply 70 as shown by way of dashed lines for illustrative purposes only, both of which are associated with the electric grid 10 for provision of electricity to the grid and consumption of electricity from the grid 10.

An apparatus or system 20, which is a virtual power plant, is connected to all the electricity controllers 30a-30n for cooperation of the household or households 40a-40n with the remaining household or households 40a-40n and the electric grid 10. In this sense, the apparatus or system 20 communicates with the electricity controllers 30a-30n to establish whether electricity is available at the respective household 40a-40n and whether electricity is demanded by the respective household 40a-40n.

As the virtual power plant 20 has data from all households 40a-40n relative to the electricity production and, preferably, electricity consumption thereof, and also has data about the electricity present and available at the electric grid 10, the first electricity supply 60, and the second electricity supply 70, the plant 20 is capable of optimizing, for all households 40a-40n or a subset thereof and in a combined or cooperative manner, the provision of electricity in both ways, i.e. from the households 40a-40n to the electric grid 10 (or the supplies 60, 70) and from the electric grid 10 to the households 40a-40n.

The virtual power plant 20, which comprises a computing apparatus, a computing system, a quantum apparatus, a quantum system, or a combination thereof, may conduct processes intended to optimize electricity provision and consumption to reduce the electricity that electric grid 10 needs and that may come non-renewable sources at different times within a predetermined period of time.

Figure 2:
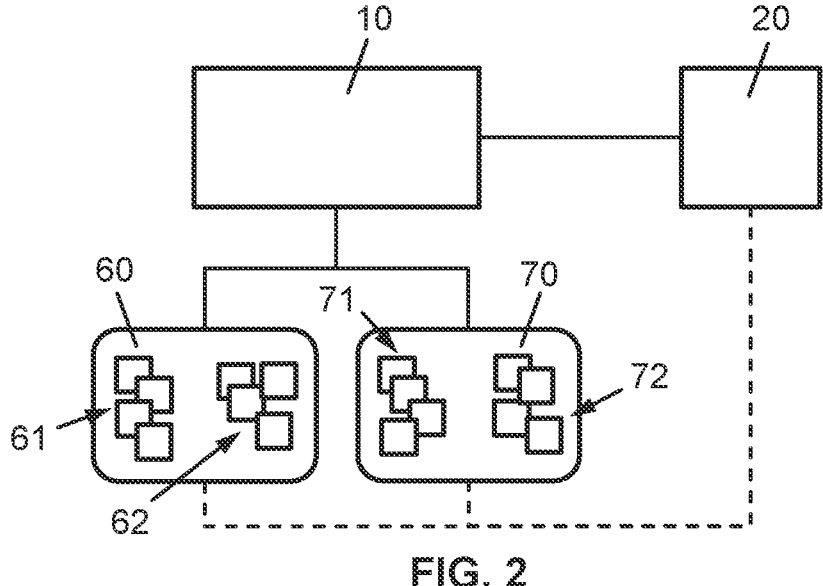
FIG. 2 shows an electric grid with access to first and second electricity supplies.

FIG. 2 shows an electric grid 10 with access to first and second electricity supplies 60, 70.

The first electricity supply 60 comprises, for each time period, a first set of electric power reserves of one or more electrical energy supplying systems 61, and a second set of first potential consumers 62 (e.g. households, buildings, factories, etc.) for possible electric power consumption. The number of any of the systems and consumers 61, 62 of the first and second set may change for different time periods, and the systems and consumers 61, 62 may be the same or be different ones (or have some in common and some others not).

Likewise, the second electricity supply 70 comprises, for each time period, a third set of one or more electrical energy generators 71 for possible electric power generation, and a fourth set of second potential consumers 72 for possible electric power consumption. Like in the first electricity supply 60, the number and identity of the generators and consumers 71, 72 in the second supply 70 might change with time.

The electric grid 10 has access to both the first and second electricity supplies 60, 70 and, thus, can request the resources of any of the two supplies 60, 70 with regards electric power retrieval and with regards electric power consumption whenever necessary. The status of the electric grid 10 can be represented by way of the parameter u, which denotes whether the electricity available in the electric grid 10 is less than the demanded electricity ($\sigma=+$), or the electricity available is more than the demanded electricity ($\sigma=-$). Therefore, the electric grid 10 can request electricity reserves 61, 71 already available or with availability in a short period of time whenever more electricity is required to serve all the consumers, and it can request electricity consumption 62, 72 whenever there is more electricity than that required to serve all the consumers. The latter particularly occurs when the difference between available electricity and demanded electricity exceeds a predetermined threshold that defines that there is too much excess electricity, which is suboptimal for the operation of the electric grid as the electricity could be wasted.

The apparatus or system 20, upon conducting an optimization, allocates households to the second set 62 or the fourth set 72 for particular time periods, and allocates renewable electrical energy production devices of households to the first set 61 or the third set 71 for particular time periods. Upon request by the electric grid 10, the resources made available by the apparatus or system 20 may be used by the electric grid 10.

The combination of a plurality of households for assisting the electric grid 10 to have available resources for electrical energy delivery, especially of renewable nature, and for electrical energy consumption, may lower the amount of electrical energy that the electric grid has or has access to that originates from non-renewable sources. Given the significantly low electrical energy production and consumption capabilities of each household alone, this purpose is served by grouping a plurality of households that, altogether, provide greater production and consumption capabilities, thereby increasing the influence of the households in the overall sustainability of the electrical network.

Input data for each electricity controller 30a-30n may be forecasts of weather conditions, thermal modeling of the household, electricity prices, etc. With these data, each electricity controller may optimize a "control trajectory" for the PT, e.g. the following 24 hours that can share with the apparatus or system 20, or even compute flexibility vectors as explained before.

Input data for the apparatus or system 20 may be the data provided by the electricity controllers 30a-30n, for example the flexibility vectors. With the flexibilities, the apparatus or system 20 optimizes which electricity controllers and, thus, which households provide electricity to the electric grid and which households request electricity from the electric grid, and at which time period of the PT; it may likewise optimize a cost or price at which the households provide the electricity to the electric grid and request electricity from the electric grid.

In some embodiments, it can be assumed that the input data for both the electricity controllers 30a-30n and the apparatus or system 20 could be stochastic, since they are computed based on forecasted data. Accordingly, to conduct the optimization in some embodiments, quantum-enhanced Monte Carlo simulation (QMC) could be used by the apparatus or system 20 and/or the electricity controllers 30a-30n to perform any of the computations they perform.

Figure 3:
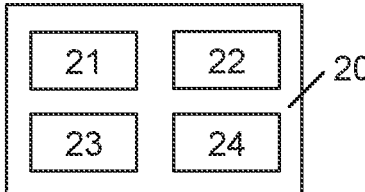
FIG. 3 shows an apparatus or system in accordance with embodiments.

FIG. 3 shows an apparatus or system 20 in accordance with embodiments. Methods according to the present disclosure can be carried out by such an apparatus or system 20.

The apparatus or system 20 comprises at least one quantum device or processor 21, and/or: at least one processor 22, namely at least one classical processor, and at least one memory 23. The apparatus or system 20 also comprises a communications module 24 at least configured to receive data from and transmit data to other apparatuses or systems in wired or wireless form, for instance from an electric grid and/or from electricity controllers.

When the apparatus or system 20 comprises the at least one quantum device or processor 21, the communications module 24 is also configured to receive data from and transmit data to the at least one quantum device or processor 21 by performing the necessary conversions, if any, to the electrical signals into e.g. light and vice versa; to that end, the communications module 24 may be provided with a converter for adapting electrical signals of the computing device into light for example when the at least one quantum device or processor 21 is photonic, or into another type of signals that the quantum device or processor 21 is adapted to receive. The quantum device or processor 21 could be provided with such a converter as well.

With the classical processor 22 and the memory 23, the apparatus or system 20 may conduct the optimization with classical processing techniques. By contrast, when provided with the at least one quantum device or processor 21, the apparatus or system 20 may conduct the optimization with one of the following techniques.

Quantum Annealing

Physics can help in solving hard computational problems by mapping them to an energy minimization. A fundamental rule of physics is that everything tends to seek a minimum-energy state: objects slide down hills, hot water cools down over time, etc. This behavior is also true in quantum physics.

With quantum annealing, the at least one quantum device or processor 21 uses quantum physics to find low-energy states of a problem and therefore the optimal or near-optimal combination of elements. The processing technique uses quantum dynamics as well as quantum tunneling to explore a landscape of possible solutions of an optimization problem in an efficient way.

More concretely, a cost function of the optimization problem is encoded into an energy function like a physical Hamiltonian, and then find its lowest-energy configuration, amounting to the solution of the problem.

In some cases, the problem is defined as a Quadratic Unconstrained Binary Optimization (QUBO) problem, equivalent to an Ising magnet with spin-spin interaction.

Without choosing a specific algorithm to solve an encoded optimization problem, the scheme of quantum annealing finds plausible low-energy configurations of such systems by using quantum fluctuations.

Trapped Ions

With this technique, ions get confined in radiofrequency traps that serve as quantum bits. Entanglement is achieved by using shared ion motional modes as a quantum bus. Initialization and readout of trapped ions are both performed by laser manipulation of the ion internal and motional states.

The ions can be quickly optically pumped to a |1i state by coupling the long-lived |0i state to an auxiliary state $|e>_{SP}$ that rapidly decays.

Qubit control is achieved by directly coupling the |0i and |1i states using a narrow electric quadrupole transition.

Readout of the ions is achieved by shining light resonant on the broad transition $|1> \rightarrow |e>_R$, and collecting the resulting scattered fluorescence photons. There is no similar transition $|0i \rightarrow |e>_R$, so the $|0>$ state appears dark.

The at least one quantum device or processor 21 can be, for example, one as described in Nam, Y., Chen, J S., Pisenti, N. C. et al. "Ground-state energy estimation of the water molecule on a trapped-ion quantum computer". npj Quantum Inf 6, 33 (2020).

Notice that this procedure could involve the combination of several quantum processors: one for optimization (say, D-Wave), and one for sampling (say, IonQ).

Neutral Atoms

Neutral atom processors may be used to solve hard computational problems, for which classical computers are inefficient. A Quantum Approximate Optimization Algorithm (QAOA) can be applied by the apparatus or system 20, specifically adapted to an ensemble of cold atoms, to solve a combinatorial optimization problem.

The QAOA algorithm naturally adapts to neutral atom quantum processors. Neutral atoms in Rydberg states are trapped by lasers and then focused individually by optical tweezers. A second laser beam acts on the atoms, where each atom defines a qubit (being 0 and 1 two of their electronic states). Measurements of the quantum register are performed via fluorescence.

A possible quantum device or processor 21 is that described in European patent application no. 21382777.7, which is hereby incorporated by reference in its entirety.

In this text, the terms "includes", "comprises", and their derivations—such as "including", "comprising", etc.—should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art—for example, as regards the choice of materials, dimensions, components, configuration, etc.—, within the general scope of the disclosure as defined in the claims.

The invention claimed is:

1. A method including the following steps:

receiving, by an apparatus or a system, a first set of values for an electric grid, a second set of values for a first electricity supply, and a third set of values for a second electricity supply, wherein:

the first set of values is indicative of electric power availability in the electric grid at different time periods within a predetermined period of time, PT, the first set of values being also indicative of an amount or ratio of the available electric power being from renewable electrical energy;

the first electricity supply comprises electric power reserves of one or more electrical energy supplying systems associated with the electric grid and possible electric power consumption by first potential consumers associated with the electric grid, and the second set of values being indicative of both the electric power reserves available and the possible electric power consumption of the first potential at the different time periods within the PT; and the second electricity supply comprises possible electric power generation by one or more electrical energy generators associated with the electric grid and possible electric power consumption by second potential consumers associated with the electric grid, and the third set of values being indicative of both the possible electric power generation and the possible electric power consumption of the second potential consumers at the different time periods within the PT, wherein the one or more electrical energy generators are capable of starting electric power generation with a predetermined time delay and are capable of maintaining the electric power production for at least a predetermined time duration;

receiving, by the apparatus or system, data from a plurality of electricity controllers, wherein all the received data form a fourth set of values, wherein each electricity controller of the plurality of controllers is associated with a household of a plurality of households and controls electricity supplied to the electric grid, stored and requested from the electric grid at the different time periods within the PT, wherein each household of the plurality of households comprises at least one renewable electrical energy production device and the fourth set of values is indicative of electrical energy producible by each device of the at least one renewable energy production device at the different time periods within the PT;

solving, by the apparatus or system based on the first, second, third and fourth sets of values, an optimization problem in which:

each electricity controller of the plurality of electricity controllers has each renewable electrical energy production device it controls assigned to one of the first supply to be available as an electric power reserve, the second supply to be available as an electrical generator, or neither supply at each time period within the PT; and each electricity controller of the plurality of electricity controllers has each household it controls assigned to one of the first supply to demand electric power, the second supply to demand electric power, or neither supply at each time period within the PT;

wherein the optimization problem increases both:

availability of renewable electrical energy deliverable by the electric grid, at each time period within the PT, whenever the first supply and/or the second supply provide electric power to the electric grid when the electricity demand exceeds the available electric power in the electric grid; and consumption of electrical energy deliverable by the electric grid, at each time period within the PT, when the available electric power in the electric grid exceeds the electricity demand;

wherein a result of the optimization problem comprises:

an allocation, by each electricity controller, of one, some or all respective devices of the plurality of renewable electrical energy production devices to one of the first and second supplies at one, some or all the different time periods within the PT; and a request, by each electricity controller, of electric power from the electric grid for supply to the respective household at one, some or all the different time periods within the PT;

wherein the apparatus or system comprises one of: a computing apparatus, a computing system, a quantum apparatus, a quantum system, or a combination thereof.

2. The method of claim 1, further comprising: commanding, by the apparatus or system, to each electricity controller to:

19 deliver electric power from the respective plurality of renewable electrical energy production devices to the electric grid according to the allocation; and/or request electric power from the electric grid to provide to the respective household according to the optimized request.

3. The method of claim 1, wherein:
the first set of values is also indicative of an amount or ratio of the electric power reserves being renewable electrical energy; and/or
the second set of values is also indicative of an amount or ratio of the possible electric power generation being of renewable electrical energy.

4. The method of claim 3, wherein the first and second sets of values are both indicative of the amount or ratio of the electric power reserves and the possible electric power generation, respectively, being renewable electrical energy; wherein the first and second sets of values optionally comprise a cost of the electric power reserves and a cost of the possible electric power generation, respectively, that are indicative of the amount or ratio of the electric power reserves being from renewable electrical energy, and of the amount or ratio of the possible electric power generation being electric power from renewable electrical energy.

5. The method of claim 1, wherein solving the optimization problem comprises constructing first and second flexibility vectors per electricity controller or receiving the first and second flexibility vectors from each electricity controller, the first flexibility vector being indicative of:
availability of the respective plurality of renewable electrical energy production devices for delivery of electric power to the electric grid in the first electricity supply at the different time periods within the PT, and availability of the respective household for demanding electric power from the electric grid in the first electricity supply at the different time periods within the PT; and the second flexibility vector being indicative of:
availability of the respective plurality of renewable electrical energy production devices for delivery of electric power to the electric grid in the second electricity supply at the different time periods within the PT, and availability of the respective household for demanding electric power from the electric grid in the second electricity supply at the different time periods within the PT.

6. The method of claim 5, wherein each first flexibility vector includes at least one binary variable per renewable electrical energy production device and per different time period within the PT, the first flexibility vector being indicative of the participation of each renewable electrical energy production device in the respective electrical energy supply at the respective time period, wherein the at least one binary variable for each device in the flexibility vector for the second supply includes two binary variables each indicative of the participation of the respective renewable electrical energy production device as a starting participant or a backup participant, and wherein each renewable electrical energy production can participate only once within the PT, either in the first or the second supplies.

7. The method of claim 6, wherein, for participation of the renewable electrical energy production devices in the second supply at each time period in the optimization problem, combined electric power or electrical energy of the devices participating as starting participants is equal to or smaller than combined electric power or electrical energy of the devices participating as backup participants at the respective time period.

8. The method of claim 7, wherein a sum of the combined electric power or electrical energy of both the renewable electrical energy production devices participating as starting participants and the renewable electrical energy production devices participating as backup participants in the optimization problem must be sufficient to maintain electric power production for at least the predetermined time duration.

9. The method of claim 5, wherein, for participation of the renewable electrical energy production devices in the first supply in the optimization problem, a sum of combined electric power of the participating devices at time t when the electric power availability is less than the electric power demand and combined electric power of the participating devices at time t when the electric power availability is less than the electric power demand must be greater than a minimum power band size and lower than a maximum power band size, respectively.

10. The method of claim 5, wherein, for participation of the renewable electrical energy production devices in the first supply in the optimization problem, each time t is divided into a plurality of subintervals, and the renewable electrical energy production devices to participate at the respective t are divided into the respective plurality of subintervals such that combined electric power of the participating devices in each subinterval is similar to the combined electric power of the participating devices in the other subintervals of the plurality of subintervals for the same time t.

11. The method of claim 5, wherein the optimization problem is defined by the following function:

$$C_0 = -\sum_{\sigma=\pm} \sum_{t=0}^{D-1} \left[ \sigma(\Gamma_t^\sigma - \hat{\lambda}_t^\sigma)\hat{E}_t^\sigma \eta_t^{(2)\sigma} + (M_t^\sigma - \hat{\mu}_t^\sigma)\hat{W}_t^\sigma + \eta_t^{(1)\sigma}\hat{W}_t^\sigma \Gamma_t^\sigma \right]$$

where: σ is either the electric power availability is less than the electric power demand when positive, or the electric power availability is more than the electric power demand when negative, and superscript σ refers to the concerned parameter in the direction of σ;
D is the predetermined period of time;
t is one subinterval of a plurality of subintervals of the PT;

$$\hat{E}_t^\sigma$$

is an aggregated electrical energy in the second electricity supply at time t;

$$\hat{\lambda}_t^\sigma$$

is a parameter related to an amount of renewable electrical energy in the second supply at time t;

$$\hat{W}_t^\sigma$$

is an aggregated power band in the first electricity supply at time;

$$\hat{\mu}_\tau^\sigma$$

is a parameter related to an amount of renewable electrical energy in the first electricity supply at time t;

$$M_\tau^\sigma \text{ and } \Gamma_\tau^\sigma$$

are cost of electrical energy of the first electricity supply and the second electricity supply, respectively, at time «; and $$\eta_t^{(1)\sigma} \text{ and } \eta_t^{(2)\sigma}$$

are parameters corresponding to either allocated electrical energy fractions for the first electricity supply and the second electricity supply, respectively, at time t, or definitions of a level of stochasticity of or level of confidence in carrying out the provision and consumption (depending on the sign of $\sigma$) of electricity to/from the electric grid.

12. The method of claim 1, wherein the first electricity supply is a second electrical energy market, and the second electricity supply is a tertiary electrical energy market.

13. The method of claim 1, wherein the first set of values comprises a cost of the electricity that is indicative of the amount or ratio of the available electric power being from renewable electrical energy.

14. A data processing device comprising at least one processor and at least one memory, and computer program code stored in the at least one memory for carrying out the steps of the method according to claim 1.

15. A system comprising:

the data processing device of claim 14;

a plurality of electricity controllers;

a plurality of renewable electrical energy production devices connectable to an electric grid through one controller of the plurality of electricity controllers, wherein at least some devices of the plurality of renewable electrical energy production devices are associated with a different household of a plurality of households;

wherein the data processing device or system commands, based on the processing conducted, the delivery of electric power from particular devices of the plurality of renewable electrical energy production devices to the electric grid at particular times.

16. A non-transitory computer-readable medium encoded with instructions which, when the program is executed by a computing apparatus, cause the computing apparatus or system to carry out the steps of a method according to claim 1.

\* \* \* \* \*